(12) United States Patent
Park et al.

(10) Patent No.: US 9,838,238 B2
(45) Date of Patent: Dec. 5, 2017

(54) METHOD FOR CONFIGURING A RECEIVER BANDWIDTH AND DEVICE THEREFOR

(71) Applicant: LG ELECTRONICS INC., Seoul (KR)

(72) Inventors: Sungjun Park, Seoul (KR); Sunyoung Lee, Seoul (KR); Sunghoon Jung, Seoul (KR); Youngdae Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 14/768,034

(22) PCT Filed: Feb. 11, 2014

(86) PCT No.: PCT/KR2014/001113
§ 371 (c)(1),
(2) Date: Aug. 14, 2015

(87) PCT Pub. No.: WO2014/157828
PCT Pub. Date: Oct. 2, 2014

(65) Prior Publication Data
US 2015/0381400 A1  Dec. 31, 2015

Related U.S. Application Data

(60) Provisional application No. 61/806,405, filed on Mar. 29, 2013.

(51) Int. Cl.
*H04L 27/26* (2006.01)
*H04L 5/00* (2006.01)
*H04L 1/18* (2006.01)

(52) U.S. Cl.
CPC ........ *H04L 27/2666* (2013.01); *H04L 1/1861* (2013.01); *H04L 5/001* (2013.01); *H04L 5/0055* (2013.01)

(58) Field of Classification Search
CPC .. H04L 1/1861; H04L 27/2666; H04L 5/0055
See application file for complete search history.

(56) References Cited

U.S. PATENT DOCUMENTS 9,462,484 B2 * 10/2016 Pelletier ................. H04L 5/001
2011/0134774 A1 * 6/2011 Pelletier ............. H04W 52/365
370/252

(Continued)

FOREIGN PATENT DOCUMENTS

KR    10-2012-0094379    8/2012

OTHER PUBLICATIONS

Interdigital Communications, "When Retuning Interruptions for SCell Activation/Deactivation are Applied", 3GPP TSG WG4 #63, R4-122365, Prague, Czech Republic, May 21-25, 2012.*

(Continued)

*Primary Examiner* — Edan Orgad
*Assistant Examiner* — Saumit Shah
(74) *Attorney, Agent, or Firm* — Lee Hong Degerman Kang & Waimey

(57) ABSTRACT

The present invention relates to a wireless communication system. More specifically, the present invention relates to a method and a device for reconfiguring a receiver bandwidth by a UE (User Equipment) in the wireless communication system, the method comprising: receiving a message related to SCell activation or deactivation command; determining whether the receiver bandwidth can be reconfigured before a specific time of a HARQ feedback transmission for the message; and reconfiguring the receiver bandwidth before the HARQ feedback transmission for the message if the receiver bandwidth can be reconfigured before the specific time.

8 Claims, 14 Drawing Sheets

(56) References Cited

U.S. PATENT DOCUMENTS

| | | | |
|---|---|---|---|
| 2011/0222502 A1 | 9/2011 | Aminaka | |
| 2012/0140689 A1 | 6/2012 | Pelletier et al. | |
| 2014/0321406 A1* | 10/2014 | Marinier | H04B 7/024 370/329 |
| 2015/0181461 A1* | 6/2015 | Kim | H04W 74/08 370/236 |

OTHER PUBLICATIONS

InterDigital Communications, "When Retuning Interruptions for SCell Activation/Deactivation are Applied," 3GPP TSG RAN WG4 #63, R4-122365, May 2012, 7 pages.
ETRI, "SCell deactivation procedure," 3GPP TSG-RAN WG2 Meeting #72, R2-106491, Nov. 2010, 4 pages.
PCT International Application No. PCT/KR2014/001113, Written Opinion of the International Searching Authority dated May 27, 2014, 9 pages.

* cited by examiner (a) Control-Plane Protocol Stack (b) User-Plane Protocol Stack

METHOD FOR CONFIGURING A RECEIVER BANDWIDTH AND DEVICE THEREFOR

CROSS-REFERENCE TO RELATED APPLICATIONS

This application is the National Stage filing under 35 U.S.C. 371 of International Application No. PCT/KR2014/001113, filed on Feb. 11, 2014, which claims the benefit of U.S. Provisional Application No. 61/806,405, filed on Mar. 29, 2013, the contents of which are all hereby incorporated by reference herein in their entirety.

TECHNICAL FIELD

The present invention relates to a wireless communication system and, more particularly, to a method for reconfiguring a receiver bandwidth and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for efficiently reconfiguring a receiver bandwidth in a wireless communication system. The technical problems solved by the present invention are not limited to the above technical problems and those skilled in the art may understand other technical problems from the following description.

Technical Solution

The object of the present invention can be achieved by providing a method for reconfiguring a receiver bandwidth by a UE (User Equipment) in the wireless communication system, the method comprising: receiving a message related to SCell activation or deactivation command; determining whether the receiver bandwidth can be reconfigured before a specific time of a HARQ feedback transmission for the message; and reconfiguring the receiver bandwidth before the HARQ feedback transmission for the message if the receiver bandwidth can be reconfigured before the specific time.

In another aspect of the present invention, provided herein is a UE (User Equipment) for reconfiguring a receiver bandwidth in the wireless communication system, the UE comprises to receive a message related to SCell activation or deactivation command; to determine whether the receiver bandwidth can be reconfigured before a specific time of a HARQ feedback transmission for the message; and to reconfigure the receiver bandwidth before the HARQ feedback transmission for the message if the receiver bandwidth can be reconfigured before the specific time.

Preferably, the message is transmitted by MAC signaling.

Preferably, the HARQ feedback transmission includes a new format indicating the SCell activation and deactivation status.

Preferably, all transmissions including the HARQ feedback transmission are not allowed during the reconfiguring the receiver bandwidth

Advantageous Effects

According to the present invention, channel information can be efficiently transmitted in a wireless communication system. Specifically, a receiver bandwidth can be efficiently configured.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
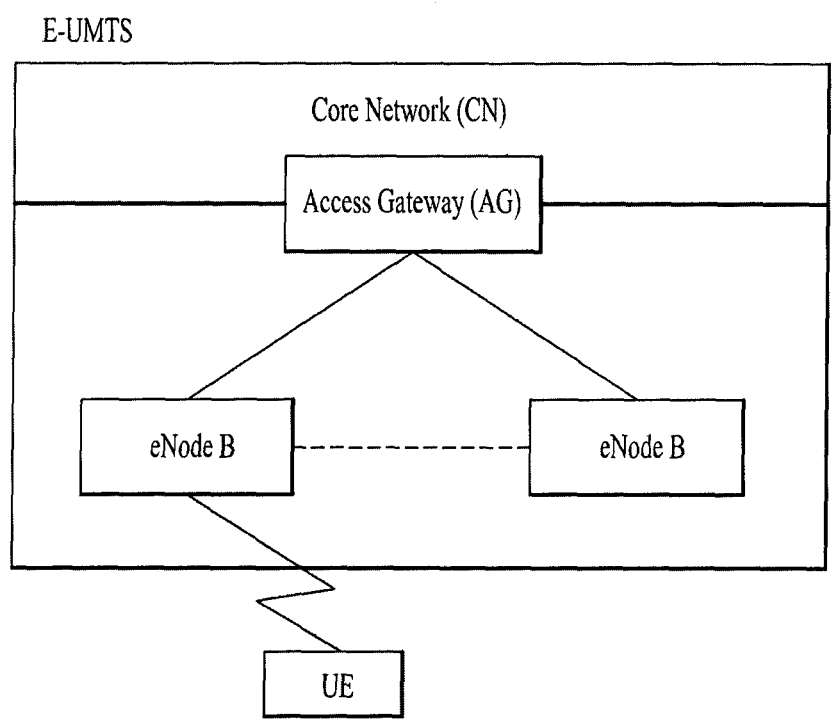
FIG. 1 is a diagram showing a network structure of an Evolved Universal Mobile Telecommunications System (E-UMTS) as an example of a wireless communication system.
Figure 2A:
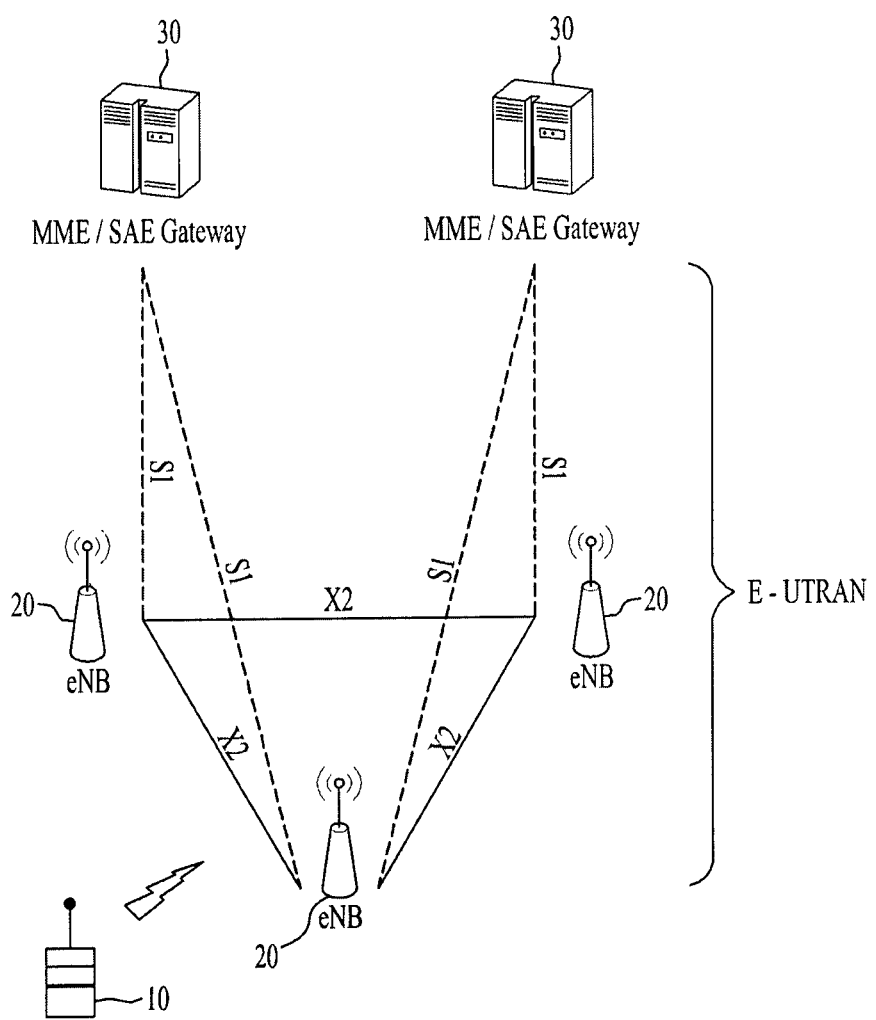
FIG. 2A is a block diagram illustrating network structure of an evolved universal mobile telecommunication system (E-UMTS).

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBRFor clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 2B:
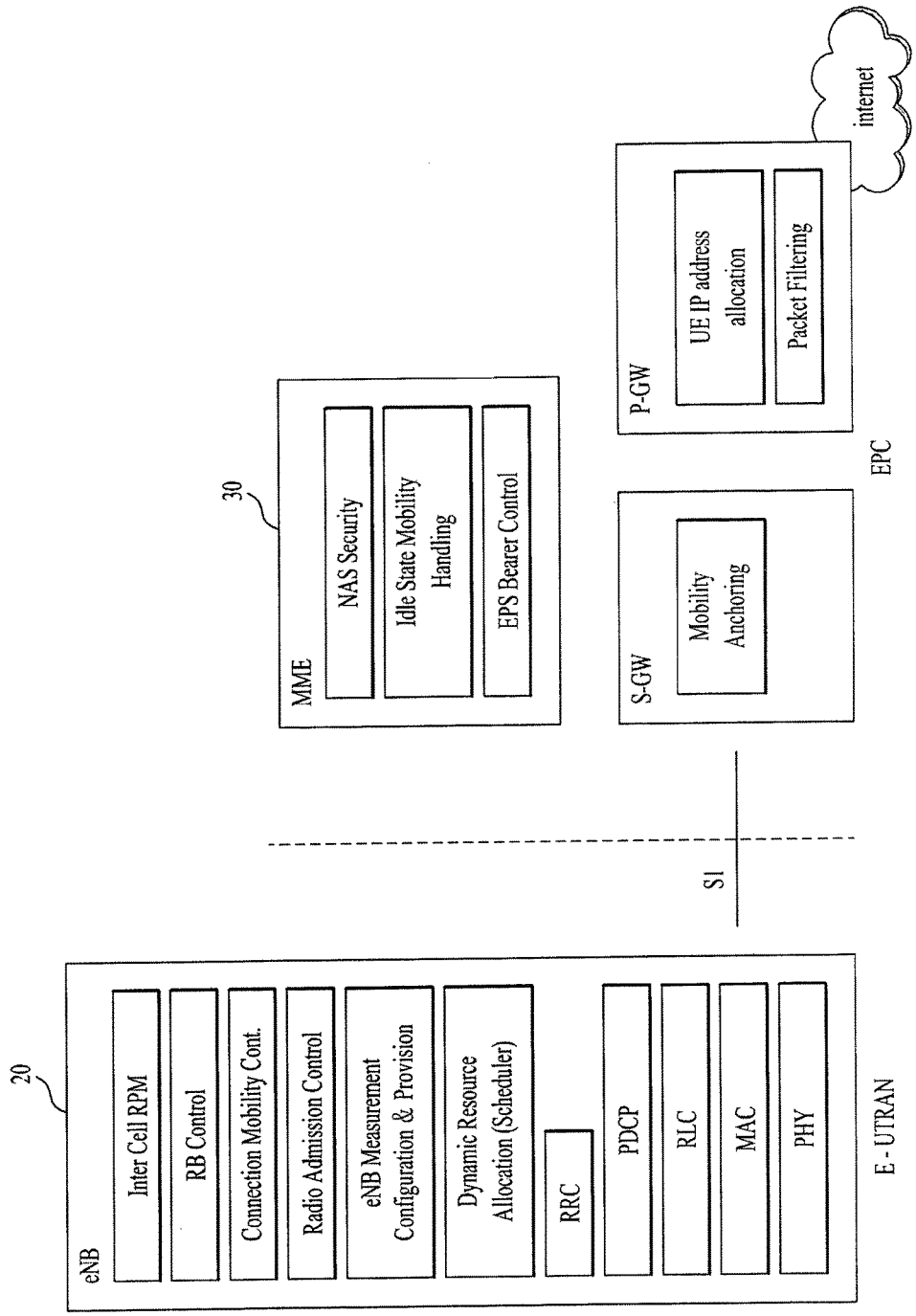
FIG. 2B is a block diagram depicting architecture of a typical E-UTRAN and a typical EPC.

FIG. 2B is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
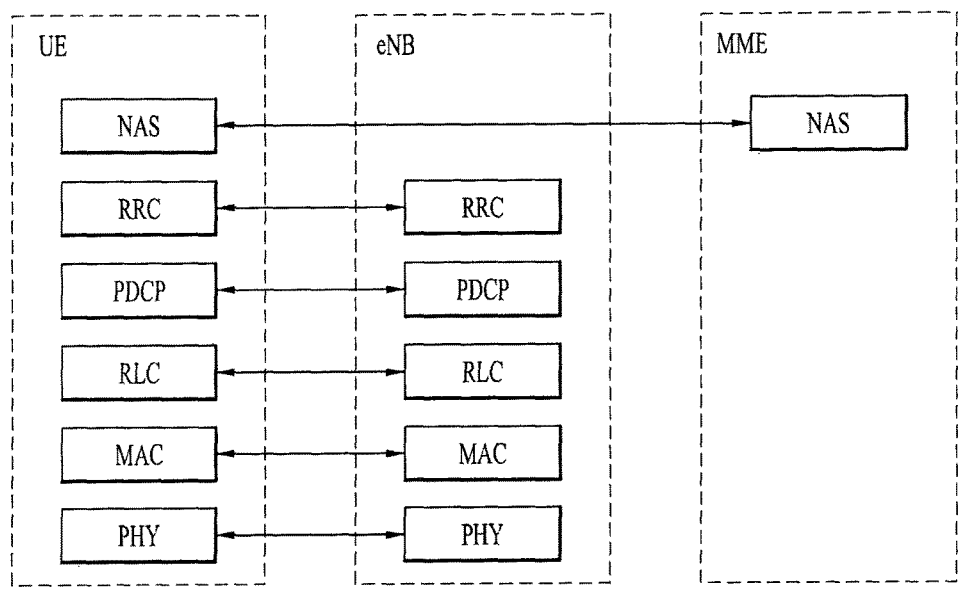
FIG. 3 is a diagram showing a control plane and a user plane of a radio interface protocol between a UE and an E-UTRAN based on a 3rd generation partnership project (3GPP) radio access network standard.
Figure 3:
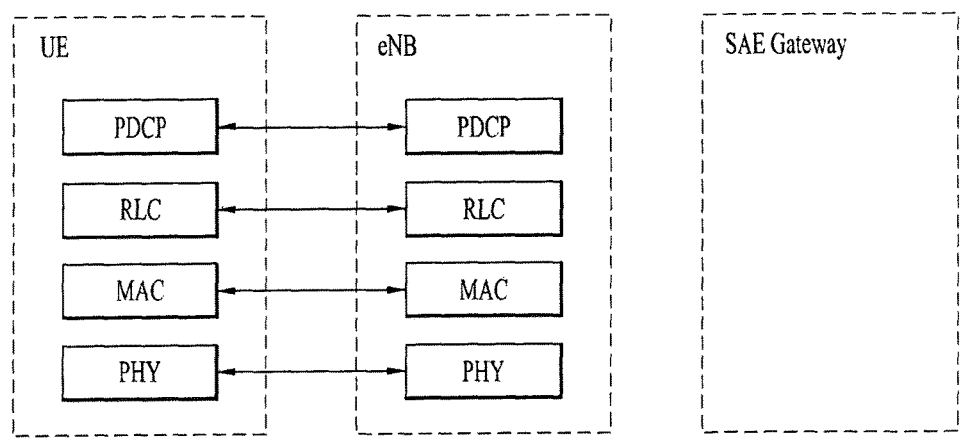

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
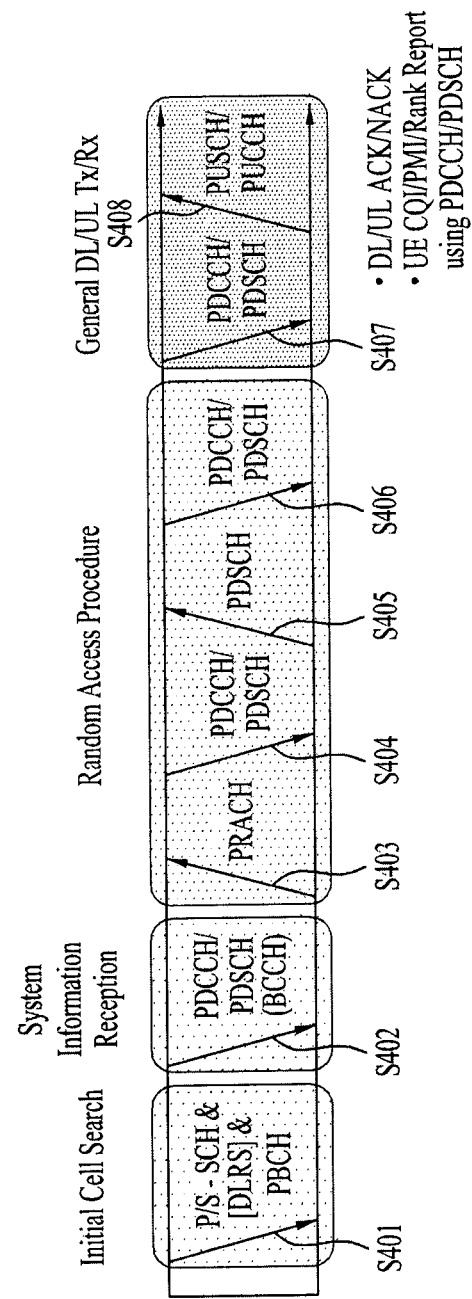
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
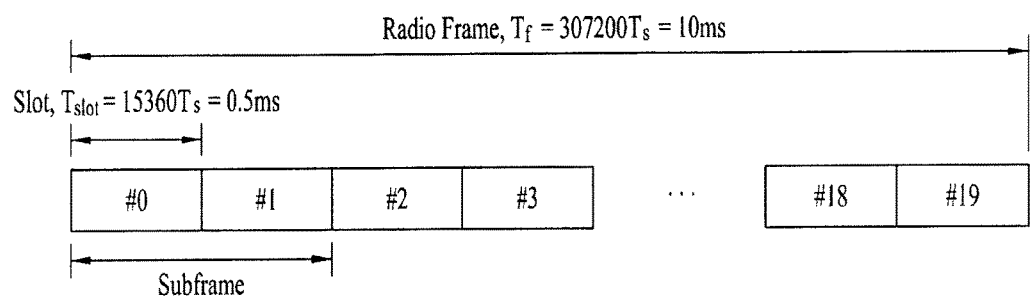
FIG. 5 is a diagram showing the structure of a radio frame used in a Long Term Evolution (LTE) system.

FIG. 5 is a diagram showing the structure of a radio frame used in an LTE system.

Referring to FIG. 5, the radio frame has a length of 10 ms (327200×Ts) and is divided into 10 subframes having the same size. Each of the subframes has a length of 1 ms and includes two slots. Each of the slots has a length of 0.5 ms (15360×Ts). Ts denotes a sampling time, and is represented by Ts=1/(15 kHz×2048)=3.2552×10−8 (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

Hereinafter, an RRC state of a UE and an RRC connection method will be described.

The RRC state indicates whether the RRC layer of the UE is logically connected to the RRC layer of the E-UTRAN. When the RRC connection is established, the UE is in a RRC_CONNECTED state. Otherwise, the UE is in a RRC_IDLE state.

The E-UTRAN can effectively control UEs because it can check the presence of RRC_CONNECTED UEs on a cell basis. On the other hand, the E-UTRAN cannot check the presence of RRC_IDLE UEs on a cell basis and thus a CN manages RRC_IDLE UEs on a TA basis. A TA is an area unit larger than a cell. That is, in order to receive a service such as a voice service or a data service from a cell, the UE needs to transition to the RRC_CONNECTED state.

In particular, when a user initially turns a UE on, the UE first searches for an appropriate cell and camps on the cell in the RRC_IDLE state. The RRC_IDLE UE transitions to the RRC_CONNECTED state by performing an RRC connection establishment procedure only when the RRC_IDLE UE needs to establish an RRC connection. For example, when uplink data transmission is necessary due to call connection attempt of a user or when a response message is transmitted in response to a paging message received from the E-UTRAN, the RRC_IDLE UE needs to be RRC connected to the E-UTRAN.

Figure 6:
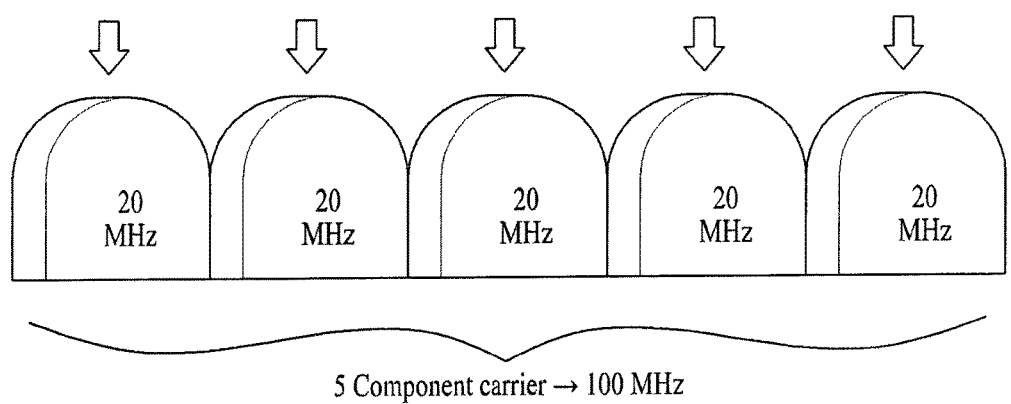
FIG. 6 is a diagram for carrier aggregation.

FIG. 6 is a diagram for carrier aggregation.

Carrier aggregation technology for supporting multiple carriers is described with reference to FIG. 6 as follows.

As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 7:
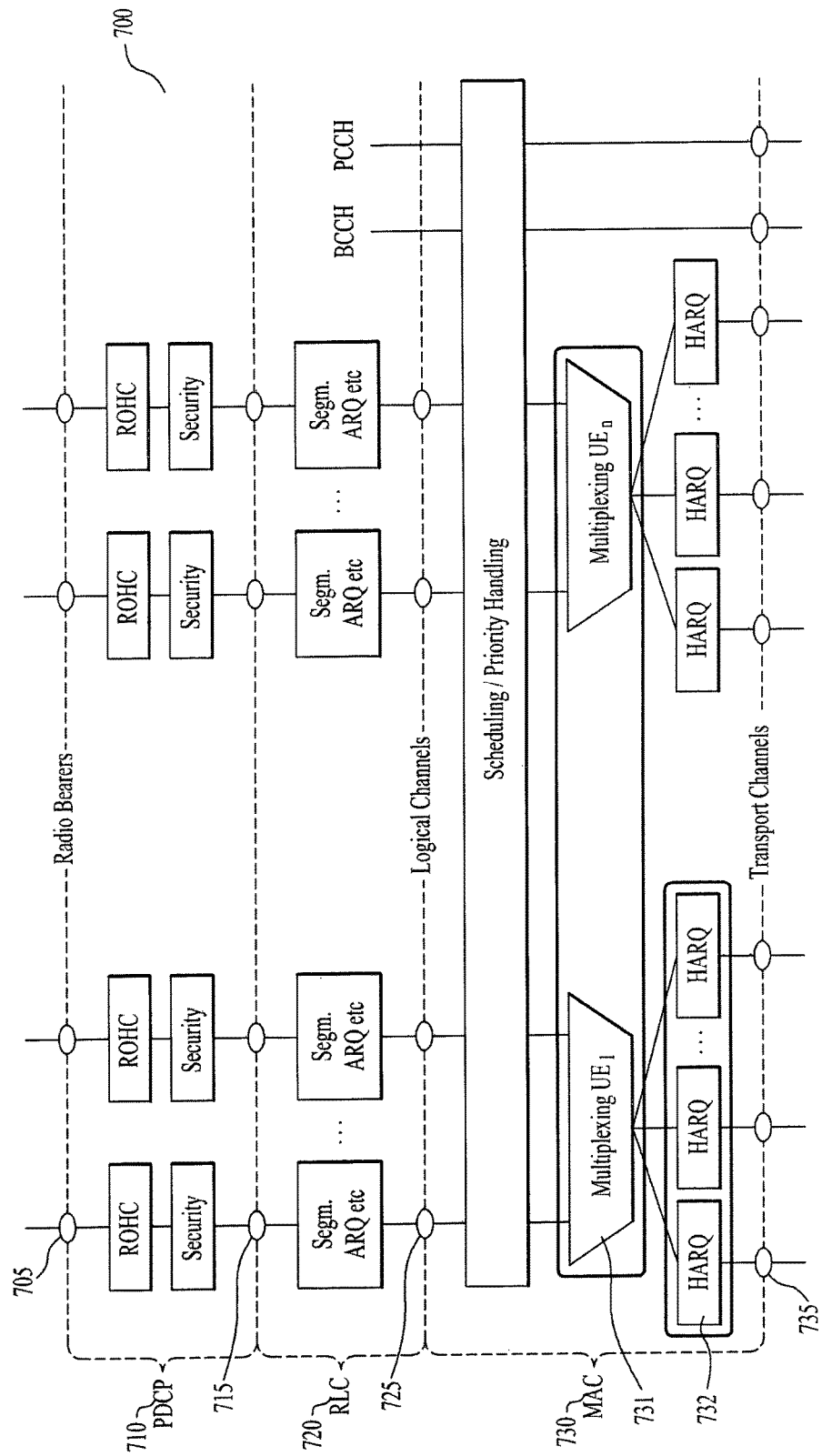
FIG. 7 is a diagram for a structure of downlink L2 (2nd layer) in carrier aggregation.
Figure 8:
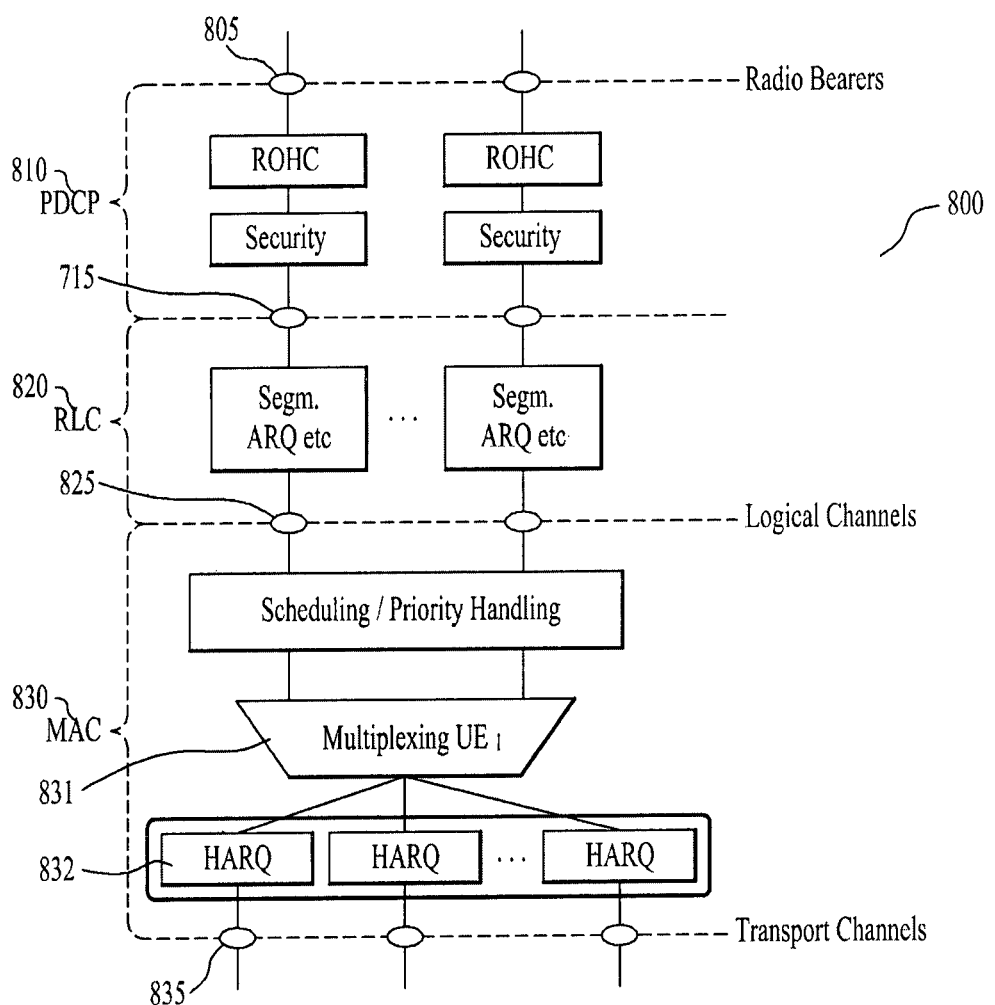
FIG. 8 is a diagram for a structure of uplink L2 (2nd layer) in carrier aggregation.

FIG. 7 is a diagram for a structure of downlink L2 (2nd layer) in carrier aggregation and FIG. 8 is a diagram for a structure of uplink L2 (2nd layer) in carrier aggregation.

In a DL L2 structure 700 shown in FIG. 7, layers of PDCP 710, RLC 720 and MAC 730 are represented. In FIG. 7, elements 705, 715, 725 and 735 provided to interfaces between the layers indicate service access points (SAP) for peer-to-peer communications. The SAP between PHY channel (not shown in the drawing) and the MAC layer provides a transport channel [735]. And, the SAP between the MAC layer and the RLC layer provides a logical channel [725]. General operations of the respective layers are as good as mentioned in the foregoing description.

The MAC layer multiplexes a plurality of logical channels (i.e., radio bearers) from the RLC layer. In the DL L2 structure, a plurality of entities 731 of the MAC layer are related to the application of MIMO (multiple input multiple output) technology. Since one transport channel is generated by multiplexing a plurality of logical channels in case of non-MIMO in a system that does not consider carrier aggregation technology, one HARQ (hybrid automatic repeat and request) entity is provided to one multiplexing entity 731 [not shown in the drawing].

On the other hand, in a system that considers carrier aggregation technology, a plurality of transport channels corresponding to a plurality of component carriers are generated. Regarding this, in the carrier aggregation technology, one HARQ entity 732 manages one component carrier. Hence, the MAC layer 730 of the system, which supports the carrier aggregation technology, provides one multiplexing entity 731 with a plurality of HARQ entities 732 and performs operations related to them. Since each of the HARQ entities 732 handles transport block independently, a plurality of transport blocks may be simultaneously transmitted/received via a plurality of component carriers.

The UL L2 structure 800 shown in FIG. 8 performs the same operations of the DL L2 structure 700 shown in FIG. 7 except that one multiplexing entity 830 is included in one MAC layer 830. In particular, a plurality of HARQ entities 832 are provided for a plurality of component carriers, operations related to a plurality of the HARQ entities 832 are performed in the MAC layer 830, and a plurality of transport blocks can be simultaneously transmitted/received via a plurality of the component carriers.

Figure 9:
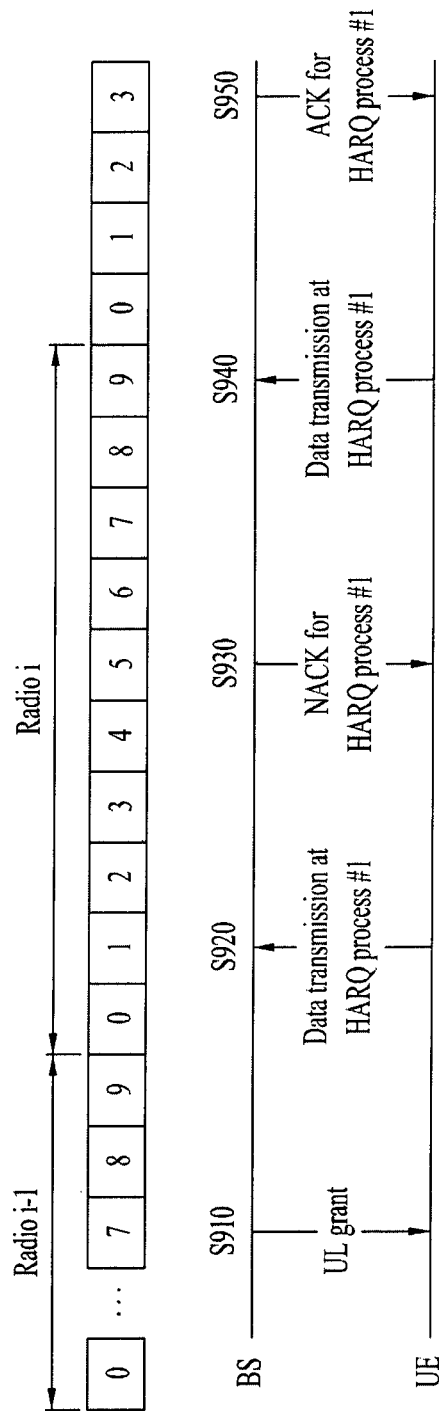
FIG. 9 is a conceptual diagram illustrating an exemplary synchronous non-adaptive UL HARQ operation.

FIG. 9 is a conceptual diagram illustrating an exemplary synchronous non-adaptive UL HARQ operation.

Referring to FIG. 9, a user equipment (UE) has a plurality of HARQ processes, and the HARQ processes may operate in a synchronous manner. That is, each HARQ process may be allocated to each TTI in a synchronous manner. For example, the LTE system assumes that the UE has 8 HARQ processes. As a result, HARQ process #1 may be allocated to the first TTI, HARQ process #2 may be allocated to the second TTI, HARQ process #8 may be allocated to the 8th TTI, HARQ process #1 may be allocated to a 9th TTI, and HARQ process #2 may be allocated to the 10th TTI. For example, if a PDCCH including a UL grant is detected at a specific TTI, the HARQ entity can identify the HARQ process in which data transmission should be carried out, and can transfer UL grant information to the identified HARQ process. For example, as can be seen from FIG. 7, if the HARQ process associated with Subframe #7 of a radio frame (i-1) having received the UL grant is set to 1, UL data may be transmitted at HARQ process #1 at Subframe #1 of the radio frame (i) and may be retransmitted at HARQ process #1 at Subframe #9 of the radio frame (i) after lapse of 8 subframes. In a synchronous HARQ operation, if the HARQ process associated with one TTI is identified, it can be recognized that the same HARQ process is associated at the corresponding TTI (TTI+8). If a certain HARQ process is associated with one TTI during the synchronous HARQ operation unless otherwise mentioned, it is assumed that the same HARQ process is associated with the 8th, 16th, and 24th TTIs after lapse of the corresponding TTI.

In step S910, the BS (or eNB) may transmit a UL grant to the UE, such that the UE may flush a Tx buffer and store new UL data in the Tx buffer. In step S920, the UE may transmit UL data to the BS (or eNB) at HARQ process #1 on the basis of resources and MCS information in response to the UL grant received at step S910. In this example, it is assumed that UL data received by the BS (or eNB) fails in decoding, such that the BS (or eNB) may transmit the NACK message in response to UL data in step S930. Upon receiving the NACK message from the BS (or eNB), the UE may retransmit the previously transmitted UL data in step S940. In this case, retransmission may be carried out at HARQ process #1 in which UL data transmission has been carried out at step S920, and the retransmission may be carried out at intervals of 8 msec. That is, a time point at which retransmission is carried out is not separately designated, and the retransmission is carried out at intervals of a predetermined time, such that this operation may correspond to a synchronous HARQ operation. In addition, the UE having received the NACK message may apply resources, MCS level, etc. designated by the previously received UL grant to retransmission without change, without receiving a separated UL grant. That is, new scheduling information for retransmission is not given, and may correspond to the non-adaptive HARQ operation. The BS having received the retransmitted UL data combines the retransmitted UL data with the previously received data, and attempts to decode the combined result. In this example, it is assumed that the BS succeeds in reception and decoding of UL data. In this case, the BS may transmit the ACK message to the UE in step S950. Although FIG. 9 assumes a uplink (UL) situation in which the UE is a data transmitter, the BS is a data receiver, and the UE receives HARQ feedback information from the UE for convenience of description and better understanding of the present invention, the HARQ operation may be carried out even in the case in which the BS transmits DL data and the UE feeds back ACK/NACK information.

FIG. 10 is a conceptual diagram illustrating an exemplary PCell interruption when the UE received SCell activation command.

In a condition of Carrier Aggregation (CA), the UE can be configured with one or more SCells in addition to the PCell. To make use of the configured SCells, activating the SCell by the MAC signaling (called it SCell activation command) is needed because the SCell which is initially configured is considered as deactivated state.

When the UE receives the SCell activation command from the eNB, it may reconfigure receiver bandwidth taking into account the SCell activation/deactivation status. When the UE makes activation of the deactivated SCell, there may be interruptions (e.g., packet drops) on the PCell if the PCell and the SCell belonging to the adjacent component carriers in the same frequency band. More specifically, if the UE receives the SCell activation command in subframe n, such interruptions remain until and including subframe n+8.

When interruptions happen on the PCell, the UE is not possible to receive/transmit signals from/to the eNB. The signals include signals on PDCCH, PDSCH, PUCCH, PUSCH, RACH, SRS and so on.

It is also important for the eNB to verify whether the UE successfully receives the SCell activation command. Normally such verification can be done by receiving the HARQ feedback (i.e., HARQ ACK) corresponding to the SCell activation command.

Figure 10A:
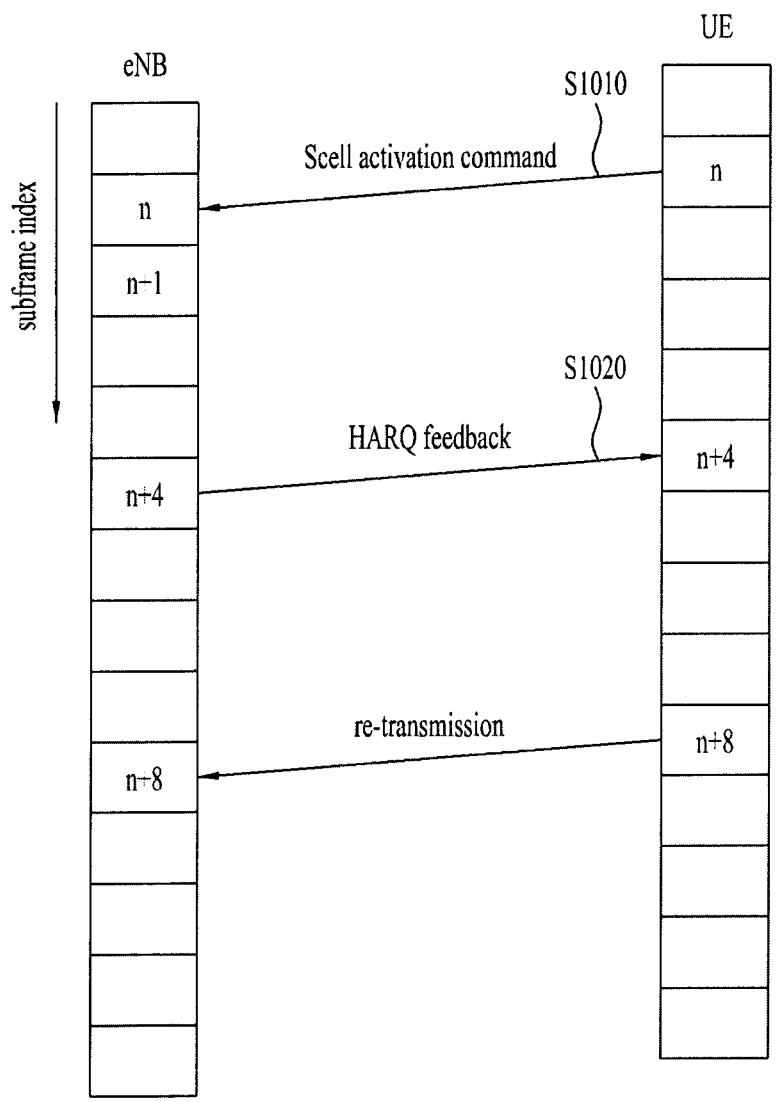
FIG. 10 is a conceptual diagram illustrating an exemplary Pcell interruption when the UE received SCell activation command.

Regarding FIG. 10A, given that the timeline of the HARQ feedback in LTE, when the SCell activation command was received in subframe n (S1010), the UE is required to send the HARQ feedback in subframe n+4 (S1020).

Figure 10B:
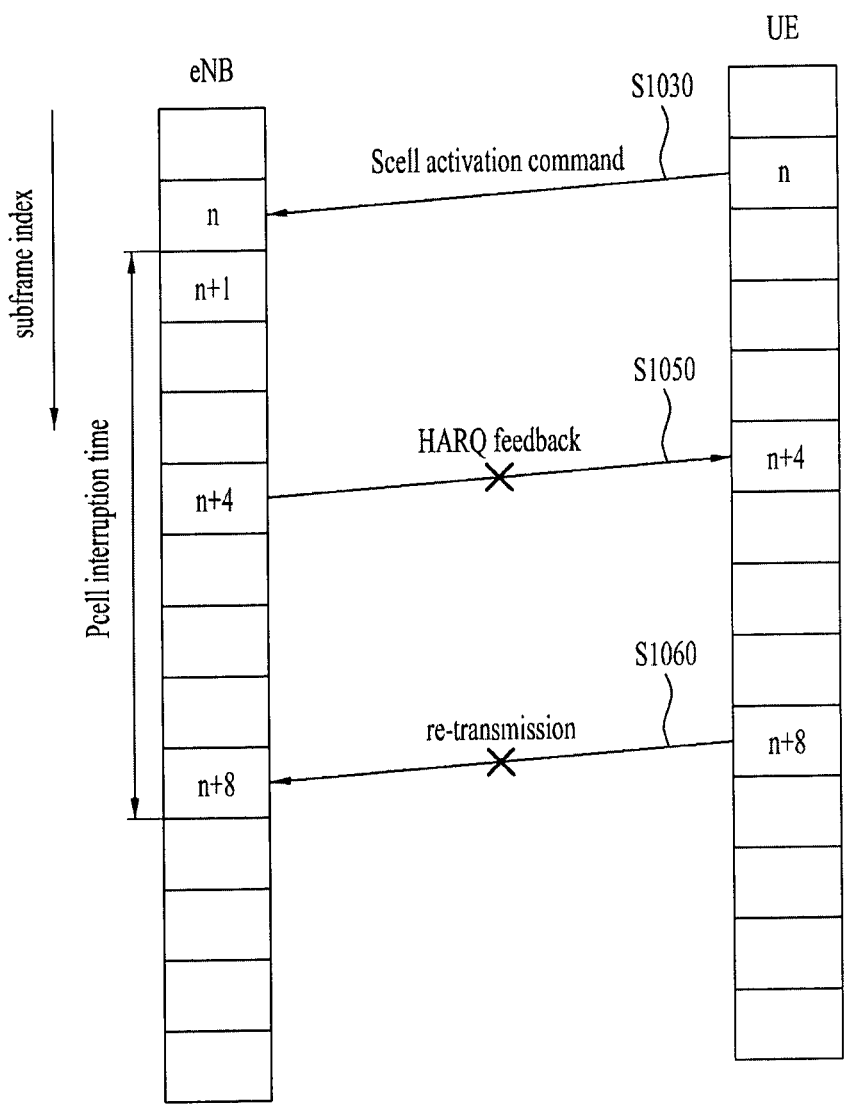

However, regarding FIG. 10B, due to the facts that if the SCell activation is received in subframe n (S1030), interruptions on the PCell take place between n+1 and n+8 (S1040), the UE is not possible to sends HARQ ACK on PUCCH in subframe n+4 (S1050) when the SCell activation command is successfully received (i.e., decoded) in subframe n. Accordingly, the eNB cannot verify whether the UE successfully receives the SCell activation command due to absence of the HARQ ACK (S1060). This may cause mismatch of the SCell activation/deactivation status between the eNB and UE and, therefore, there would be data loss.

Note that there may be also problem on the UE power consumption when the eNB cannot verify whether the UE successfully receives the SCell deactivation command due to the interruptions.

Figure 11:
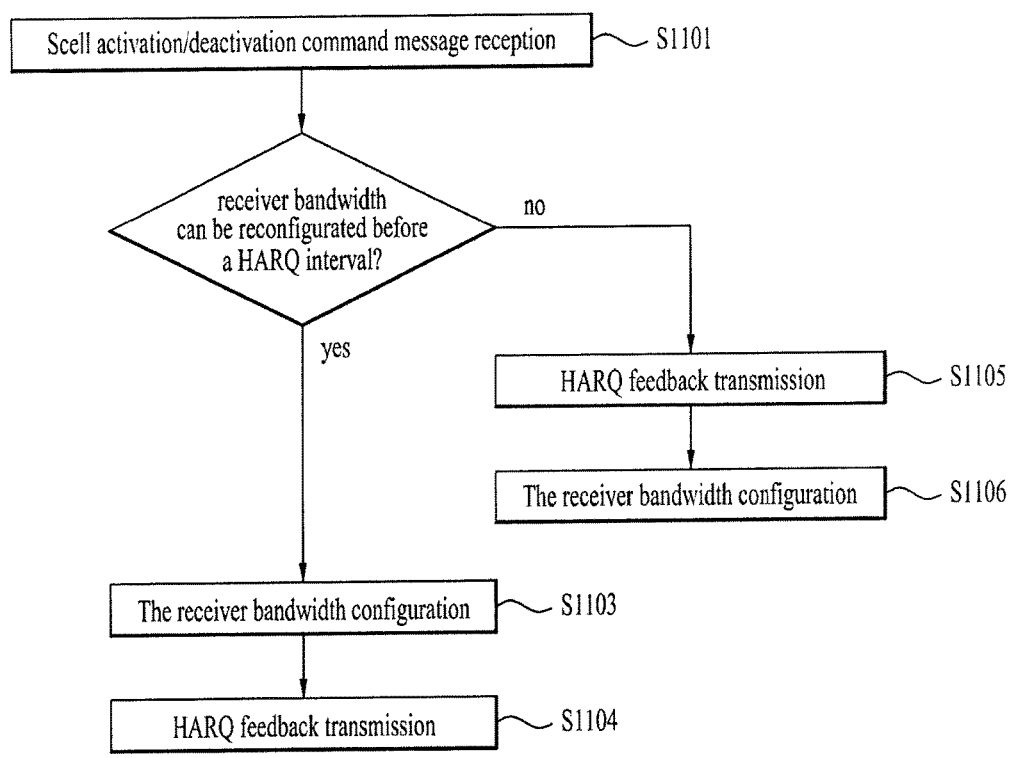
FIGS. 11 and 12 are a conceptual diagram illustrating receiver bandwidth reconfiguration according to embodiments of the present invention.

FIG. 11 is flow diagrams illustrating receiver bandwidth reconfiguration according to embodiments of the present invention.

In this invention, in order to ensure that the eNB verifies the reception of the SCell activation or deactivation command in the UE side, the UE sends an acknowledgement of successfully receiving the SCell activation or deactivation command to the eNB.

When the UE successfully receives the SCell activation or deactivation command (S1101), the UE can send the acknowledgement first and then start reconfiguring the receiver bandwidth. Or, the UE can first reconfigure the receiver bandwidth and then send the acknowledgment. These procedures can be performed as whether the receiver bandwidth can be reconfigured before a specific time of a HARQ feedback transmission for the message or not.

The UE may determine whether the receiver bandwidth can be reconfigured before a specific time of a HARQ feedback transmission for the message (S1102). If the UE may determine that the receiver bandwidth can be reconfigured before the specific time, the UE may reconfigure the receiver bandwidth first (S1103). And the UE may transmit HARQ feedback for the message (S1104).

On the other hand, if the UE may determine that the receiver bandwidth cannot be reconfigured before the specific time, the UE may transmit HARQ feedback for the message first (S1105). And the UE may reconfigure the receiver bandwidth (S1106).

The interruption on the PCell may take place during the time when the UE reconfigures the receiver bandwidth (or RF retuning). The reconfiguration of receiver bandwidth happens when the deactivated SCell is activated or when the activated SCell is deactivated.

The UE can be configured with the interruption time (e.g., x ms) by the eNB or the interruption timer can be a fixed value. The acknowledgement can be either HARQ feedback on PUCCH or a new format indicating the SCell activation and deactivation status.

The UE can be configured with one or more serving cells. The serving cell includes the PCell and the SCell. This invention can also apply to any case where the UE is required to reconfigure the receiver bandwidth e.g., due to SCell addition/removal or the measurement of the deactivated SCell.

When the UE receives SCell activation or deactivation command message from the eNB, the UE determines whether the receiver bandwidth can be reconfigured before a specific time of a HARQ feedback transmission for the message based on capacity of the UE. And then, the UE reconfigures the receiver bandwidth before the HARQ feedback transmission for the message if the receiver bandwidth can be reconfigured before the specific time.

Figure 12A:
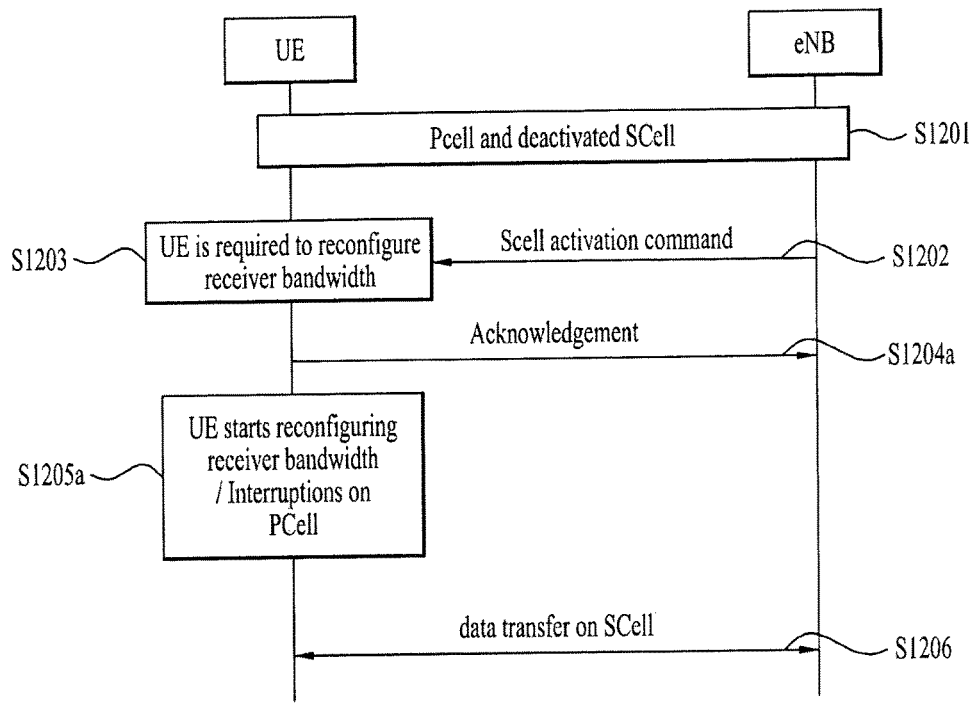
Figure 12B:
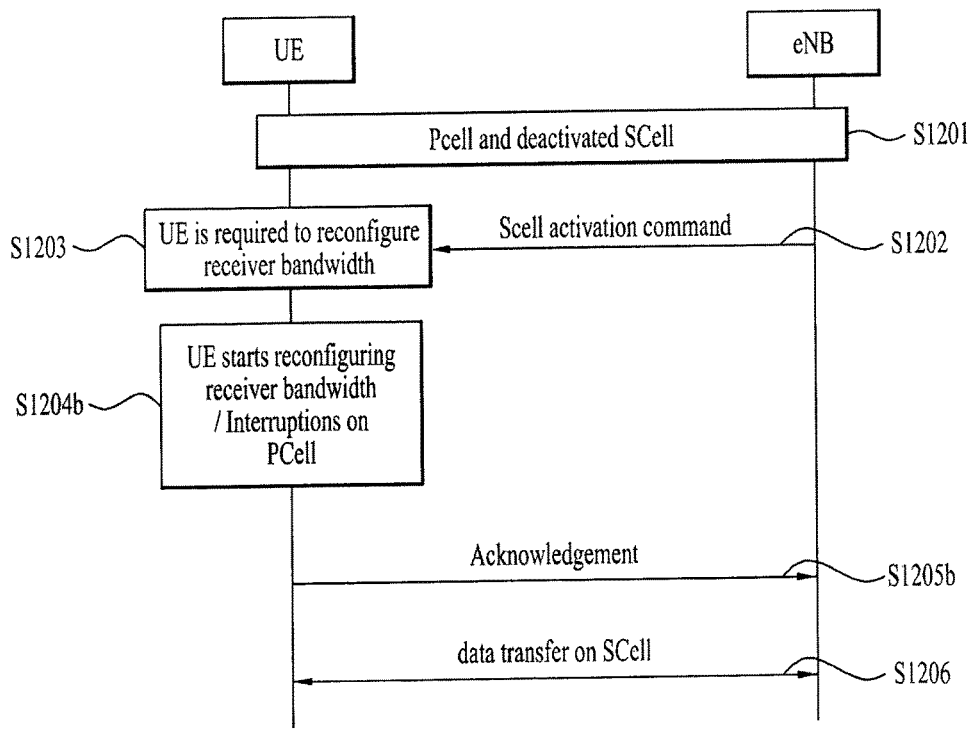

FIGS. 12A and 12B are conceptual diagrams illustrating receiver bandwidth reconfiguration according to embodiments of the present invention.

FIG. 12A is a conceptual diagram illustrating receiver bandwidth reconfiguration after sending acknowledgment. In this case, the UE identifies that the receiver bandwidth cannot be reconfigured before the specific time.

If the UE receives the SCell activation or deactivation command in subframe n, the UE first sends the acknowledgement (when the command is successfully decoded) before reconfiguration of receiver bandwidth because the UE cannot finish the reconfiguration of the receiver bandwidth before the HARQ feedback transmission for the message. The UE can start reconfiguring the receiver bandwidth after sending the acknowledgment.

That is, assuming that the acknowledgement is the HARQ ACK, if the UE receives the SCell activation or deactivation command in subframe n, the UE can send HARQ ACK in subframe n+4, and start reconfiguring the receiver bandwidth in e.g., n+5 (i.e., after sending the HARQ feedback). Accordingly, the interruptions on the PCell take place from subframe n+5 until subframe n+5+x.

The FIG. 12A shows an example of how the UE sends the acknowledgment before reconfiguring the receiver bandwidth. The UE is configured with the PCell and the SCell. The SCell is deactivated (S1201). The UE receives the SCell activation command (S1202). Upon this command, the UE is required to reconfigure receiver bandwidth which causes interruption on the PCell for some time (S1203). The UE first may send the acknowledgment of the SCell activation command reception (S1204a) if the receiver bandwidth cannot be reconfigured before the interruption time. Then, the UE can start reconfiguring the receiver bandwidth, causing interruptions on the PCell (S1205a). After the interruption ends, the UE may be possible to perform data transfer on the SCell (S1206).

FIG. 12B is a conceptual diagram illustrating receiver bandwidth reconfiguration before sending acknowledgment. In this case, the UE identifies that the receiver bandwidth can be reconfigured before the specific time.

If the UE receives the SCell activation or deactivation command in subframe n, the UE first reconfigures the receiver bandwidth. It means that the interruption time can start from subframe n+1. When the interruption time ends, the UE sends the acknowledgement to the eNB.

Because in this invention, the acknowledgment is assumed to be the HARQ feedback or the new format indicating the SCell activation and deactivation status, the UE can send the HARQ feedback (i.e., ACK) to the eNB after the interruption time ends. Also, the UE can send the new format after the interruption time ends. The new format indicating the SCell activation and deactivation status includes the status of activation and deactivation of the configured serving cell. For example, if the UE is configured with two serving cell, and the first serving cell is deactivated and the second serving cell is activated, then, the new formation informs the eNB that the first serving cell is deactivated and the second serving cell is activated.

The FIG. 12B shows an example of how the UE sends the acknowledgment after reconfiguring the receiver bandwidth. The UE is configured with the PCell and the SCell The SCell is deactivated (S1201). The UE receives the SCell activation command (S1202). Upon this command, the UE is required to reconfigure receiver bandwidth which causes interruption on the PCell for some time (S1203). The UE starts reconfiguring the receiver bandwidth, causing interruptions on the PCell (S1204b) if the receiver bandwidth can be reconfigured before the interruption time. After the interruption ends, the UE sends the acknowledgment of the SCell activation command reception (S1205b). After sending interruption ends, the UE may be possible to perform data transfer on the SCell (S1206).

Figure 13:
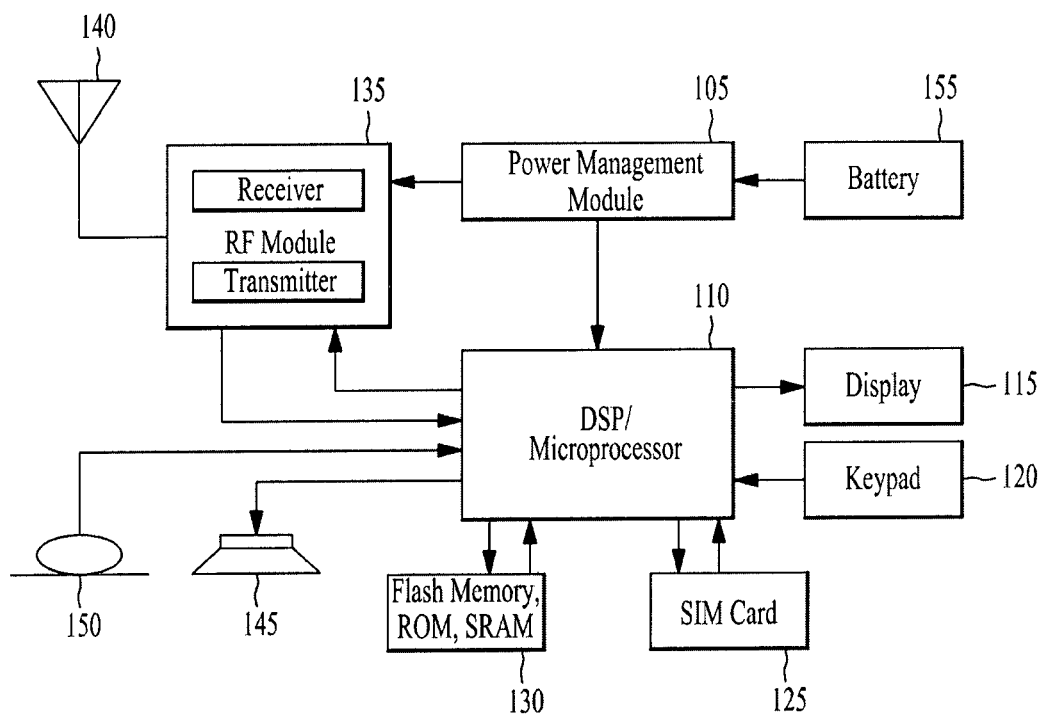
FIG. 13 is a block diagram of a communication apparatus according to an embodiment of the present invention.

FIG. 13 is a block diagram of a communication apparatus according to an embodiment of the present invention.

The apparatus shown in FIG. 13 can be a user equipment (UE) and/or eNB adapted to perform the above mechanism, but it can be any apparatus for performing the same operation.

As shown in FIG. 13, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 13 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 13 may represent a network apparatus comprising a transmitter (135) configured to transmit a request message to a UE and a receiver (135) configured to receive the transmission or reception timing information from the UE. These transmitter and receiver may constitutes the transceiver (135). The network further comprises a processor (110) connected to the transmitter and the receiver. This processor (110) may be configured to calculate a latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for reconfiguring a receiver bandwidth by a UE (User Equipment) in a wireless communication system, the method comprising:
  receiving a message related to SCell (Secondary Cell) activation or deactivation command in a first subframe;
  determining, based on a capacity for reconfiguring the receiver bandwidth of the UE, whether the receiver bandwidth can be reconfigured before a second subframe for transmitting a HARQ (Hybrid-ARQ) feedback; and
  transmitting the HARQ feedback in the second subframe;
  wherein when the UE determines that the receiver bandwidth can be reconfigured before the second subframe, the UE starts the reconfiguring of the receiver bandwidth in a subframe immediately following the first subframe, and wherein when the UE determines that the receiver bandwidth cannot be reconfigured before the second subframe, the UE starts the reconfiguring of the receiver bandwidth in a subframe immediately following the second subframe.

2. The method of claim 1, wherein the message is transmitted by MAC signaling.

3. The method of claim 1, wherein the HARQ feedback includes an indicator indicating a SCell activation status or a SCell deactivation status.

4. The method of claim 1, wherein all transmissions including the HARQ feedback are not allowed during the reconfiguring the receiver bandwidth.

5. A UE (User Equipment) for reconfiguring a receiver bandwidth in a wireless communication system, the UE comprising:
an RF module; and
a processor connected to the RF module,
wherein the processor is configured:
to receive a message related to SCell (Secondary Cell) activation or deactivation command in a first subframe,
to determine, based on a capacity for reconfiguring the receiver bandwidth of the UE, whether the receiver bandwidth can be reconfigured before a second subframe for transmitting a HARQ (Hybrid-ARQ) feedback, and
to transmit the HARQ feedback in the second subframe,
wherein when the UE determines that the receiver bandwidth can be reconfigured before the second subframe, the UE starts the reconfiguring of the receiver bandwidth in a subframe immediately following the first subframe, and
wherein when the UE determines that the receiver bandwidth cannot be reconfigured before the second subframe, the UE starts the reconfiguring of the receiver bandwidth in a subframe immediately following the second subframe.

6. The UE of claim 5, wherein the message is transmitted by MAC signaling.

7. The UE of claim 5, wherein the HARQ feedback includes an indicator indicating a SCell activation status or a SCell deactivation status.

8. The UE of claim 5, wherein all transmissions including the HARQ feedback are not allowed during the reconfiguring the receiver bandwidth.

* * * * *